A. ELROD.
SAW GRINDING MACHINE.
APPLICATION FILED JAN. 14, 1915.
1,153,297.
Patented Sept. 14, 1915.
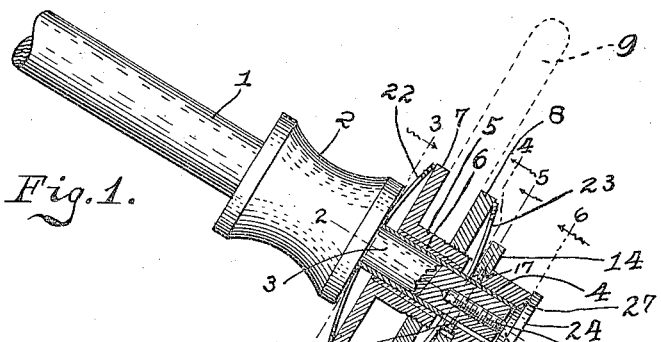
Fig. 1.
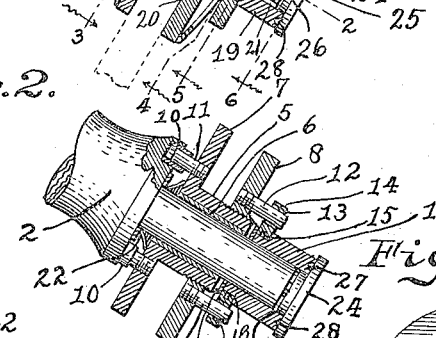
Fig. 2.
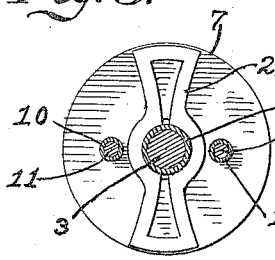
Fig. 3.
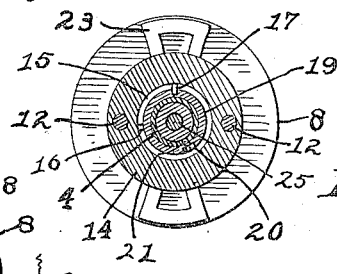
Fig. 5.
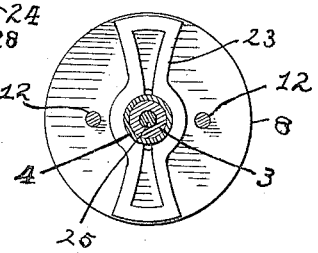
Fig. 4.
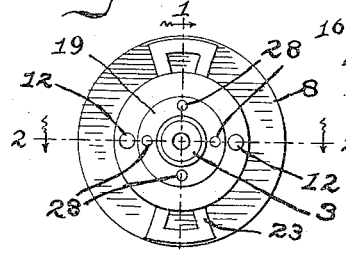
Fig. 6.
Fig. 7.
Witnesses
Chas. N. Leonard.
A. C. Rice.
Inventor
Abraham Elrod
By Bradford & Doolittle
Attorneys
COLUMBIA PLANOGRAPH CO., WASHINGTON, D. C.

UNITED STATES PATENT OFFICE.

ABRAHAM ELROD, OF SEYMOUR, INDIANA.

SAW-GRINDING MACHINE.

1,153,297.  Specification of Letters Patent.  Patented Sept. 14, 1915.

Application filed January 14, 1915. Serial No. 2,172.

*To all whom it may concern:*

Be it known that I, ABRAHAM ELROD, a citizen of the United States, residing at Seymour, Jackson county, and State of Indiana, have invented and discovered certain new and useful Improvements in Saw-Grinding Machines, of which the following is a specification.

My invention relates to saw grinding machines and particularly to improvements upon that type of machine set forth in my Patent No. 1,074,047 of September 23, 1913.

The objects of the present invention are to prevent wear on the arbor, to provide means whereby the parts on which the wearing takes place may be readily replaced at small expense, to provide spring pressure means for the wheel holding mechanism that will avoid the necessity of boring the holding disks, to provide retaining means for the springs and to provide effective locking means for adjusting the tension of the springs.

With these objects and others in view, my invention is embodied in preferable form in the construction and arrangement of parts hereinafter described and illustrated in the accompanying drawings.

In these drawings, Figure 1 is a side view in elevation, partly in longitudinal section on the dotted line 1—1 of Fig. 6 of an arbor and a grinding wheel showing my improvements applied thereto; Fig. 2, a section on the line 2—2 of Fig. 6; Fig. 3, a cross section on the line 3—3 of Fig. 1; Fig. 4, a section on the line 4—4 of Fig. 1; Fig. 5, a section on the line 5—5 of Fig. 1; Fig. 6, a section on the line 6—6 of Fig. 1 and Fig. 7, a detail perspective of the tension adjusting locking cap.

Referring to the drawings, 1 is the arbor of a saw grinding machine and 2 a collar fixed thereon. The arbor 1 is provided with an outer reduced portion 3 and on this portion is fixed a bushing 4. Mounted upon this bushing is a hub 5, having an interior bushing 6 which is adapted to bear upon the bushing 4. Integral with the hub 5 and extending radially therefrom at the inner end thereof is a disk 7 which forms one member of the grinding wheel clamp or holder. The outer end of the hub 5 is screw threaded in a direction opposite to the direction of rotation of the arbor and adapted to engage this screw threaded portion of the hub is a removable and adjustable clamping disk 8.

The grinding wheel 9 is adapted to be clamped between the disks 7 and 8, the threaded connection between the hub and the disk 8 permitting the clamp to be adjusted to fit and engage grinding wheels of different thicknesses.

The hub 5 and its bushing 6 are movable freely on the bushing of the arbor longitudinally of the arbor. This free sliding movement of the grinding wheel holder permits the grinding wheel to accommodate itself to any irregularity in the saw tooth and also enables the wheel to be applied to the teeth with a yielding pressure such as will prevent "burning" of the teeth in the grinding operation.

Projecting outwardly from the inner face of the collar 2 are inserted hollow bushings 10 into which are adapted to project threaded removable pins 11 fixed in the inner face of the clamping disk 7. Similarly the disk 8 is provided with outwardly extending removable pins 12 which extend into inserted hollow bushings 13 which are driven into apertures in a rotatable disk collar 14. This collar is provided with an interior circumferential groove 15, which groove has a transverse recess 16 formed therein which enables the collar to be slipped over a key 17 which projects radially from the face of a reduced portion 18 of a sleeve 19. The sleeve 19 is provided with an interiorly projecting screw or pin 20 which is adapted to enter a keyway or groove 21 formed in the bushing 4 of the arbor and which keyway serves to prevent the rotation of the sleeve 19 with respect to the arbor.

Mounted on the arbor bushing between the outer face of the collar 2 and the inner face of the disk 7 is a spring 22 which spring consists of a single integral piece of continuous spring metal recessed longitudinally thereof and provided with an aperture in the center to enable it to be slipped over the arbor and having its outer ends bent outwardly so as to bear against the face of the disk 7 and thus exert a yielding pressure against the wheel holder. Owing to its continuous form, this ring requires no means of fastening either to the collar or to the disk, thus avoiding the necessity of boring either of these parts for the purpose of retaining the spring in position. A similar spring 23 is mounted on the arbor bushing between the collar 14 and the disk 8 and serves to exert a yielding pressure against the grinding wheel holder on the lower side thereof.

In order to lock the sleeve 19 against longitudinal movement on the arbor and to enable the tension of the springs against the automatically sliding wheel holder to be adjusted, an end locking cap 24 is provided which cap has a central inwardly extending screw 25 adapted to engage a threaded aperture formed in the arbor. This cap is also provided with a centering boss 26 adapted to enter the hollow sleeve 19. On its inner face the cap is provided with a boss or pin 27 which is adapted to snap into any one of the four shallow retaining recesses 28. By pressing inwardly on the sleeve 19 so as to carry the same inwardly on the arbor, the pressure of the springs against the wheel holder will be increased and by screwing up the locking cap 24, the sleeve may be retained in this adjusted position. As the cap is screwed into position, the pin 27 will be permitted to spring into one of the locking recesses 28, the sleeve yielding under the pressure of the spring sufficiently to permit this engagement and the cap is thus locked against rotation.

With a construction as above described, it will be seen that the wearing pressure imparted to the holder from the grinding wheel will be borne by the pins 11 and 12 and their respective bushings. Should these parts become worn, they may be readily removed and replaced, thus avoiding the necessity of discarding or repairing the entire arbor which is now required to be done, when the parts become so worn that the grinding wheel and its holder will not travel in a true line but will tend to "wabble" which action impairs the effectiveness of the grinding operation. The removable bushings 4 and 6 also assist in this ready replaceability of any of the parts that receive wear.

The adjustable locking means consisting of the screw cap provides effectively against the displacement of the parts due to end thrusts.

Having thus described my invention, what I claim is:—

1. In a saw grinding machine, in combination with a grinding wheel, a rotating arbor, a member carrying said wheel and freely movable on the arbor longitudinally thereof, removable wear receiving pins carried by said member and removable bushings carried by the arbor to engage said pins.

2. In a saw grinding machine, in combination with a grinding wheel, a rotating arbor, a wheel holding member mounted on said arbor and movable longitudinally thereof, said member having disks which clamp the wheel and each provided with removable pins extending longitudinally of the arbor and means on said arbor outside of each disk provided with removable bushings to engage said pins.

3. In a saw grinding machine, in combination with a grinding wheel, a rotating arbor, a wheel clamping member mounted on said arbor and freely movable longitudinally thereof, said clamping member comprising a hub, a disk fixed thereto, a disk adjustably mounted on said hub, each of said disks having longitudinally extending removable pins, said arbor having a collar provided with removable bushings to engage the pins of the fixed hub disk, a rotatably adjustable and longitudinally movable collar surrounding the arbor, said adjustable collar being provided with removable bushings to engage the pins of said other disk.

4. In a grinding machine, in combination with a rotating arbor, a grinding wheel, a wheel clamping device, freely movable longitudinally on the arbor, a sliding non-rotatable sleeve on said arbor, a spring between said sleeve and clamping device and a locking device at the end of the arbor adapted to bear against said sleeve.

5. In a saw grinding machine, in combination with a rotating arbor, a grinding wheel, a wheel clamping device mounted in said arbor for free movement longitudinally thereof, said device including disks to bear against the wheel, one of said disks being adjustable, a non-rotatable longitudinally movable sleeve mounted on the arbor, a locking cap having means to bear against said sleeve and means to engage said arbor, and a spring between said disk and said sleeve.

6. In a saw grinding machine, in combination with a rotating arbor, a grinding wheel, a wheel clamping device mounted on the arbor for free movement longitudinally thereof, a sliding non-rotatable sleeve mounted on the arbor between said device and the outer end of the arbor, a locking cap having a screw to engage said arbor and having a part to press against said sleeve and means carried by said cap and sleeve to prevent the rotation of the cap after adjustment.

7. In a saw grinding machine, in combination with a rotating arbor, a grinding wheel, a wheel clamping member movable freely longitudinally on said arbor, a spring for bearing against said member, said spring consisting of a continuous single piece of metal mounted loosely on said arbor and held between said member and a fixed part of the arbor.

8. In a grinding machine in combination with a rotating arbor, a grinding wheel, a wheel clamping device mounted on said arbor for free longitudinally slidable movement thereon, said clamping device including an adjustable disk, a non-rotatable longitudinally movable sleeve on said arbor, an adjustable locking member for said sleeve, a rotatable collar mounted on said sleeve, said collar and disk having engaging pin and hole means and a spring between said disk and collar.

9. In a grinding machine, in combination with a grinding wheel, a rotating arbor, a wheel clamping device mounted to slide longitudinally on said arbor, a longitudinally slidable sleeve on said arbor, a spring between said sleeve and wheel clamping device and a locking cap for said sleeve having a screw to enter the arbor and having a head to bear against the end of said sleeve, said cap and sleeve carrying engaging pin and recesses adapted to hold the cap against rotatable movement.

In witness whereof, I have hereunto set my hand and seal at Indianapolis, Indiana, this 6th day of January, A. D. nineteen hundred and fifteen.

ABRAHAM ELROD. [L. S.]

Witnesses:
H. P. DOOLITTLE,
A. C. RICE.

Copies of this patent may be obtained for five cents each, by addressing the "Commissioner of Patents, Washington, D. C."